L. WOLFORD.
GLASS BLOWING MACHINE.
APPLICATION FILED APR. 24, 1915.
1,209,635.
Patented Dec. 19, 1916.
10 SHEETS—SHEET 7.
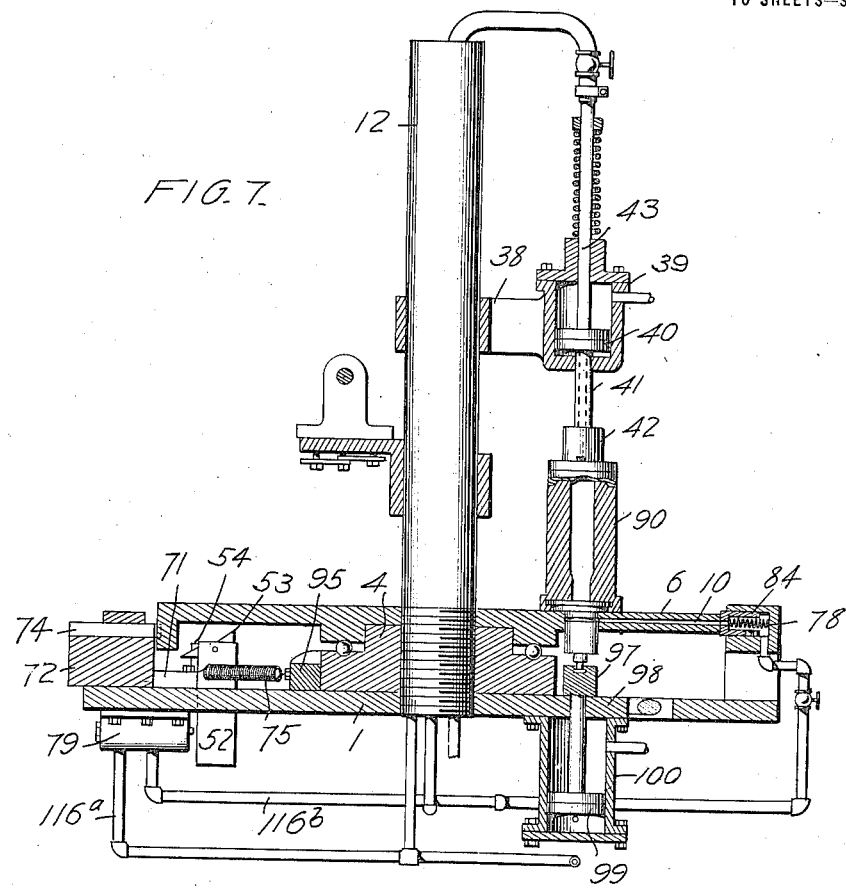
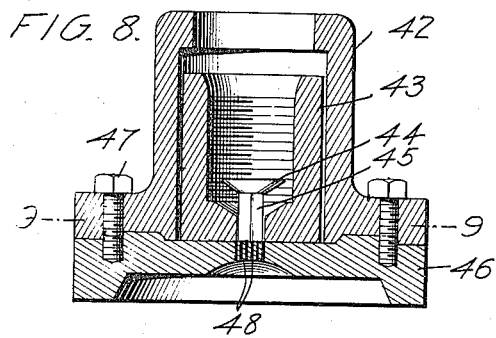
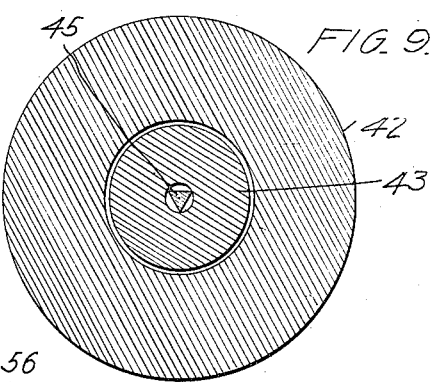
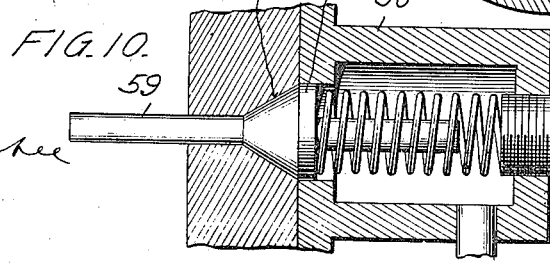
Inventor
LORENZO WOLFORD.

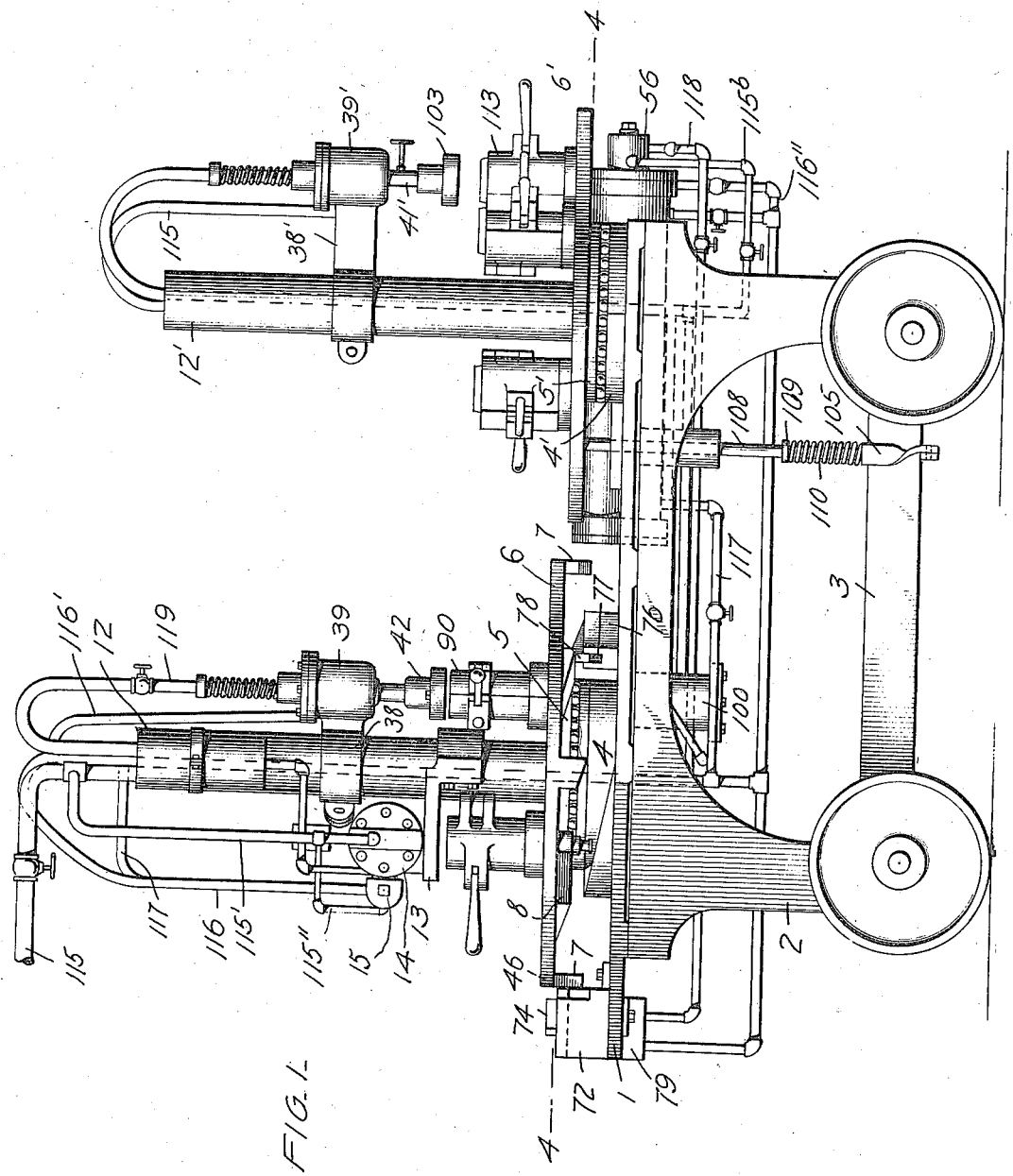

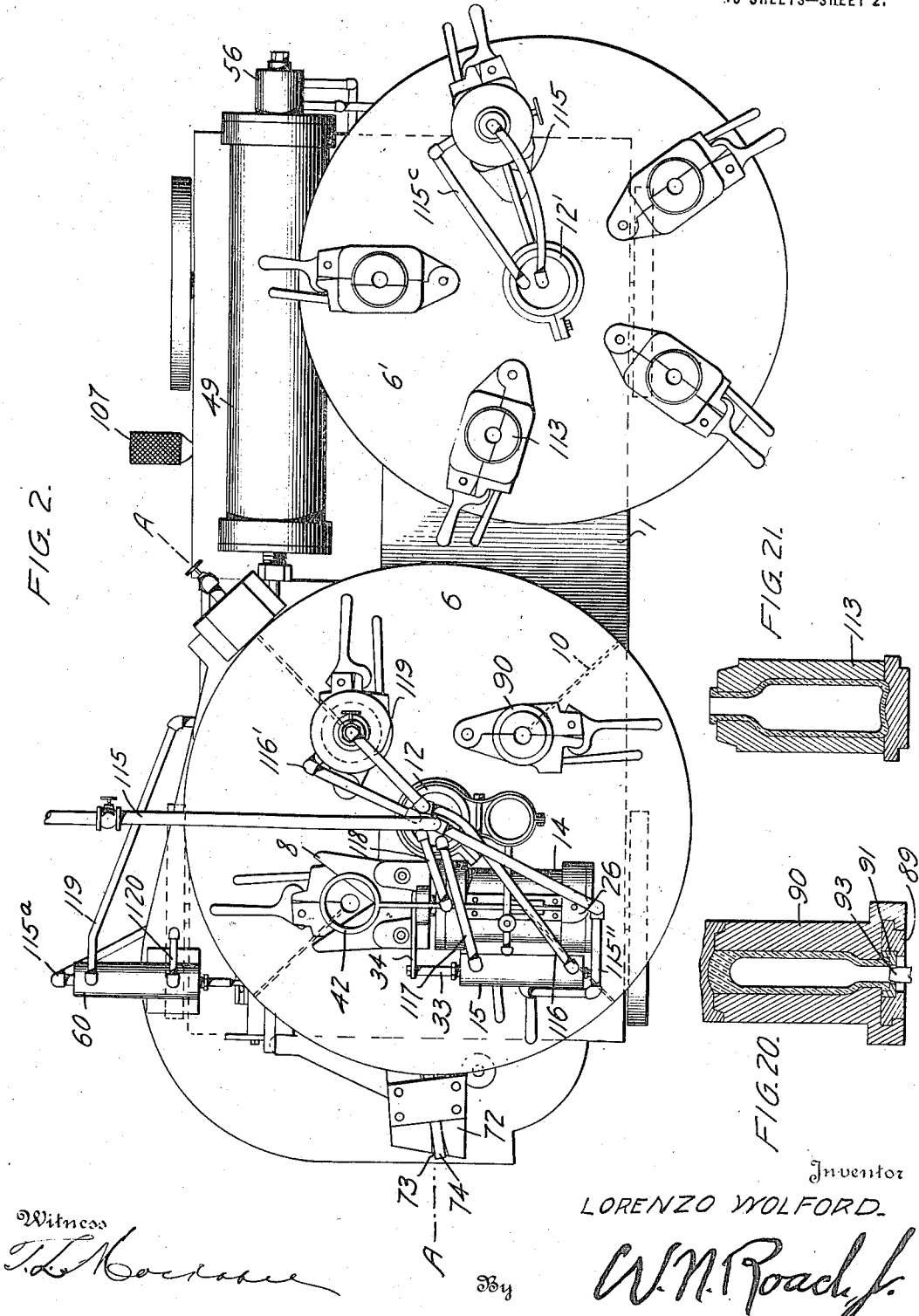

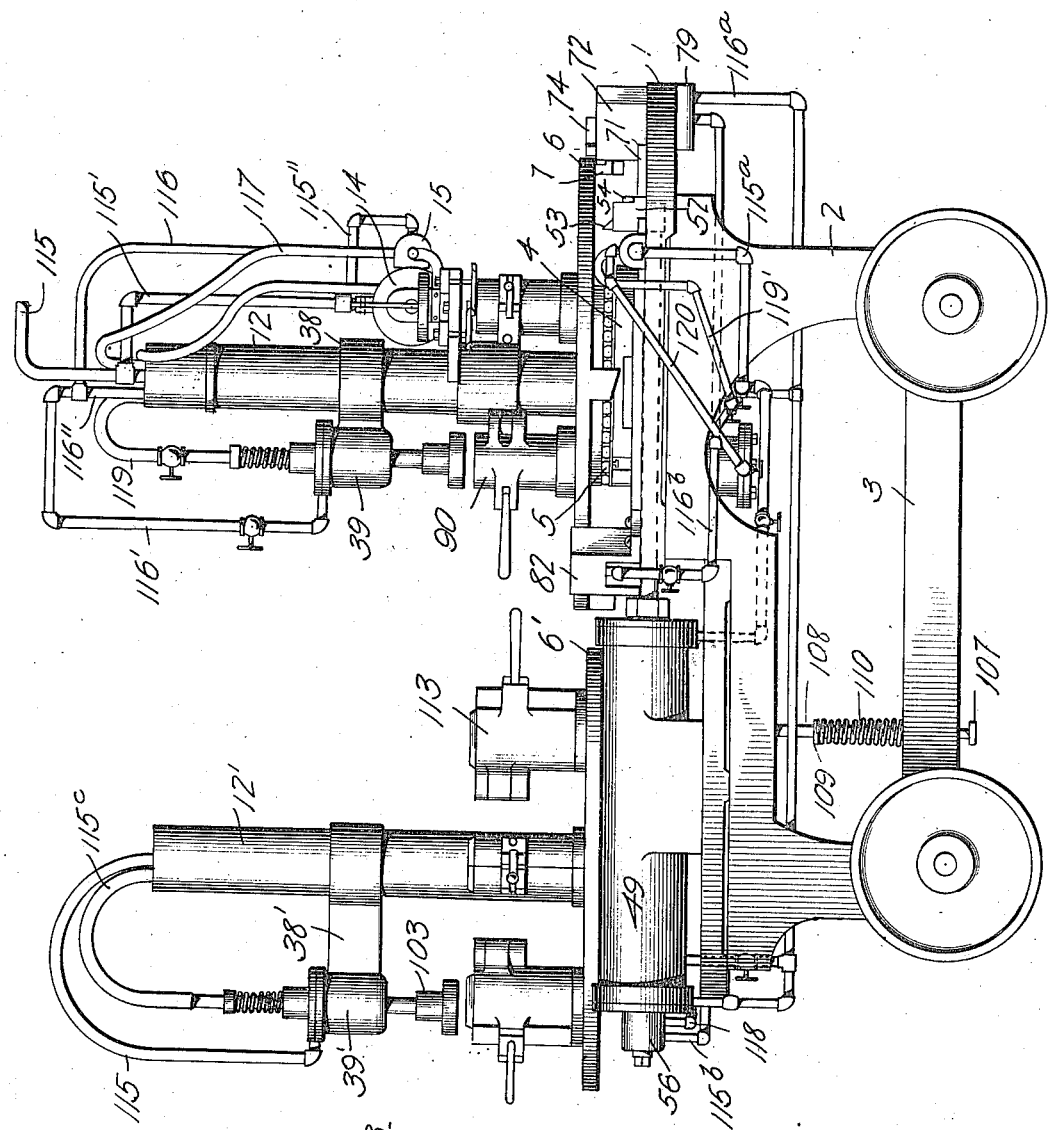

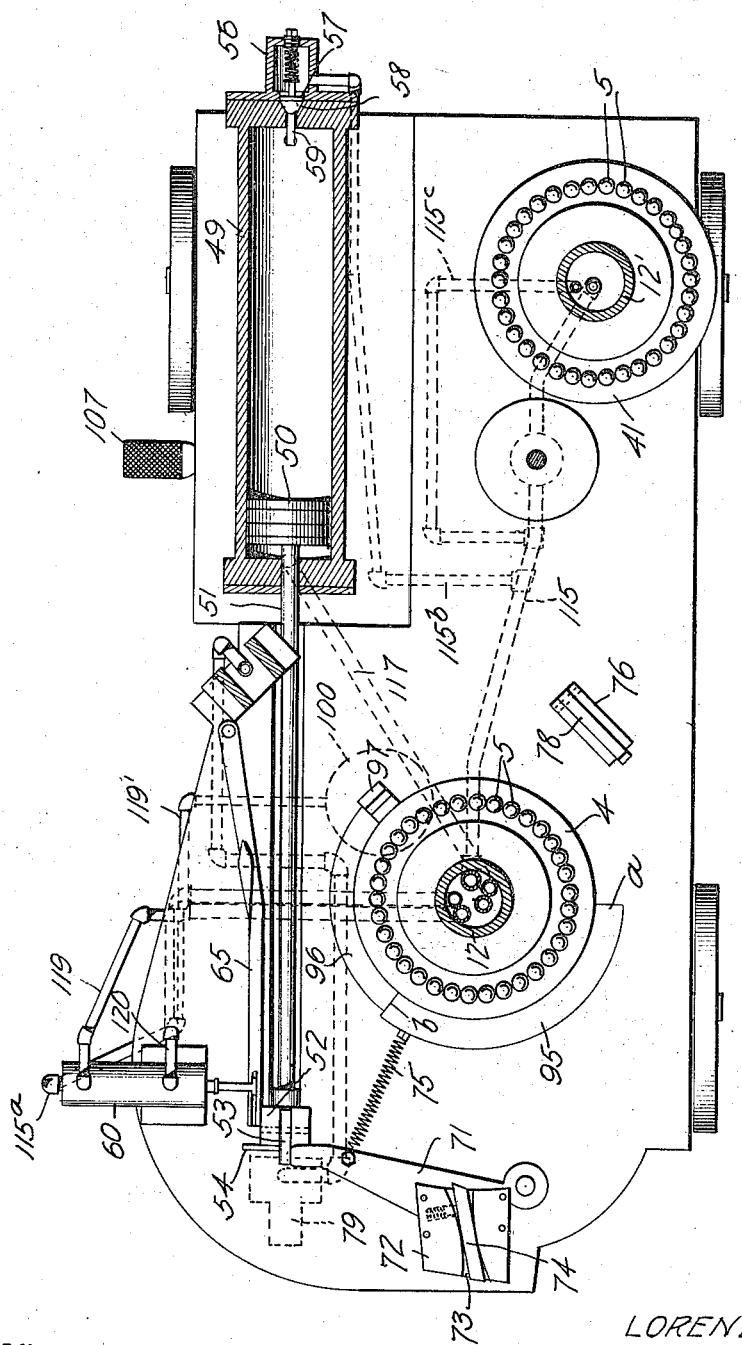

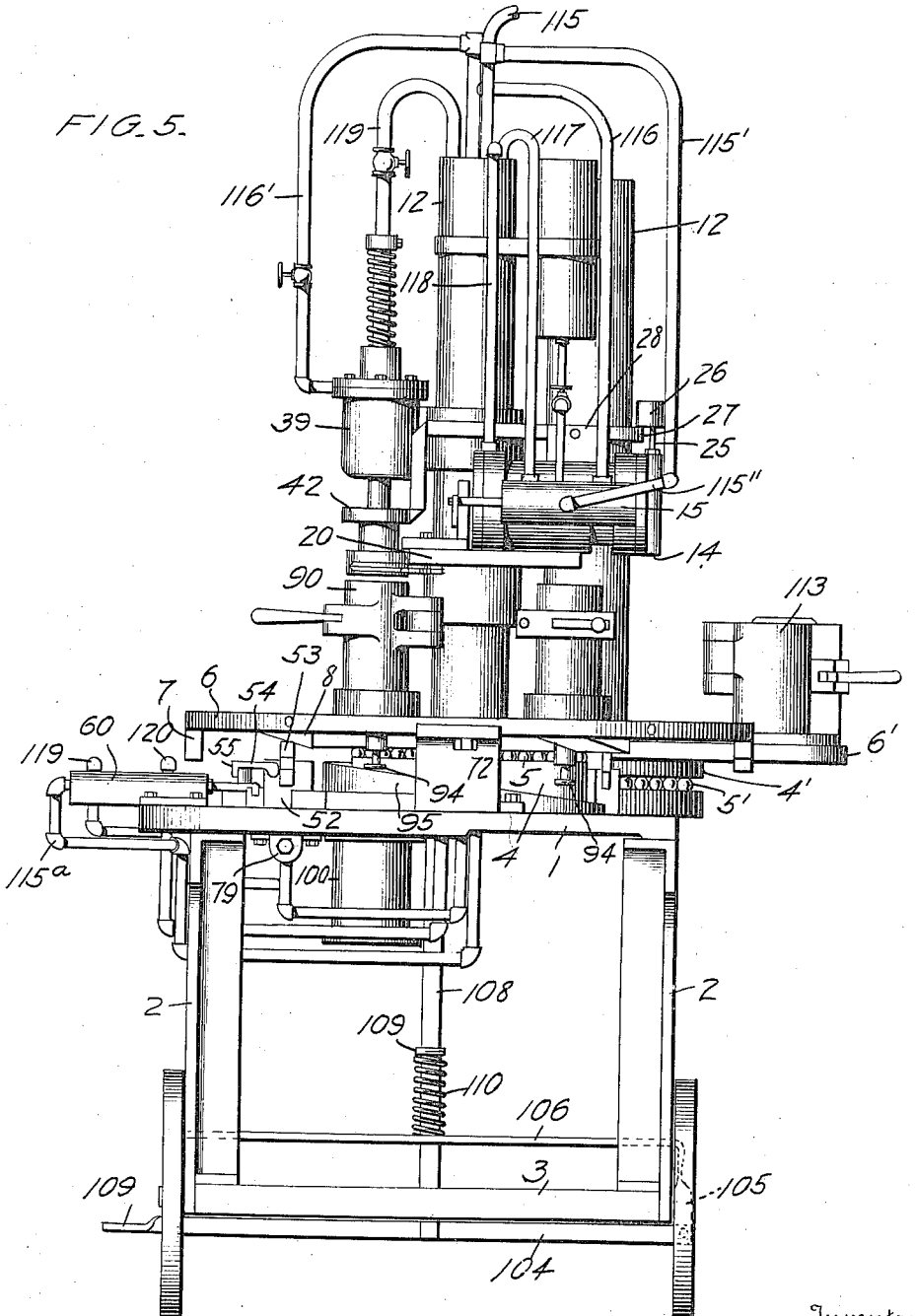

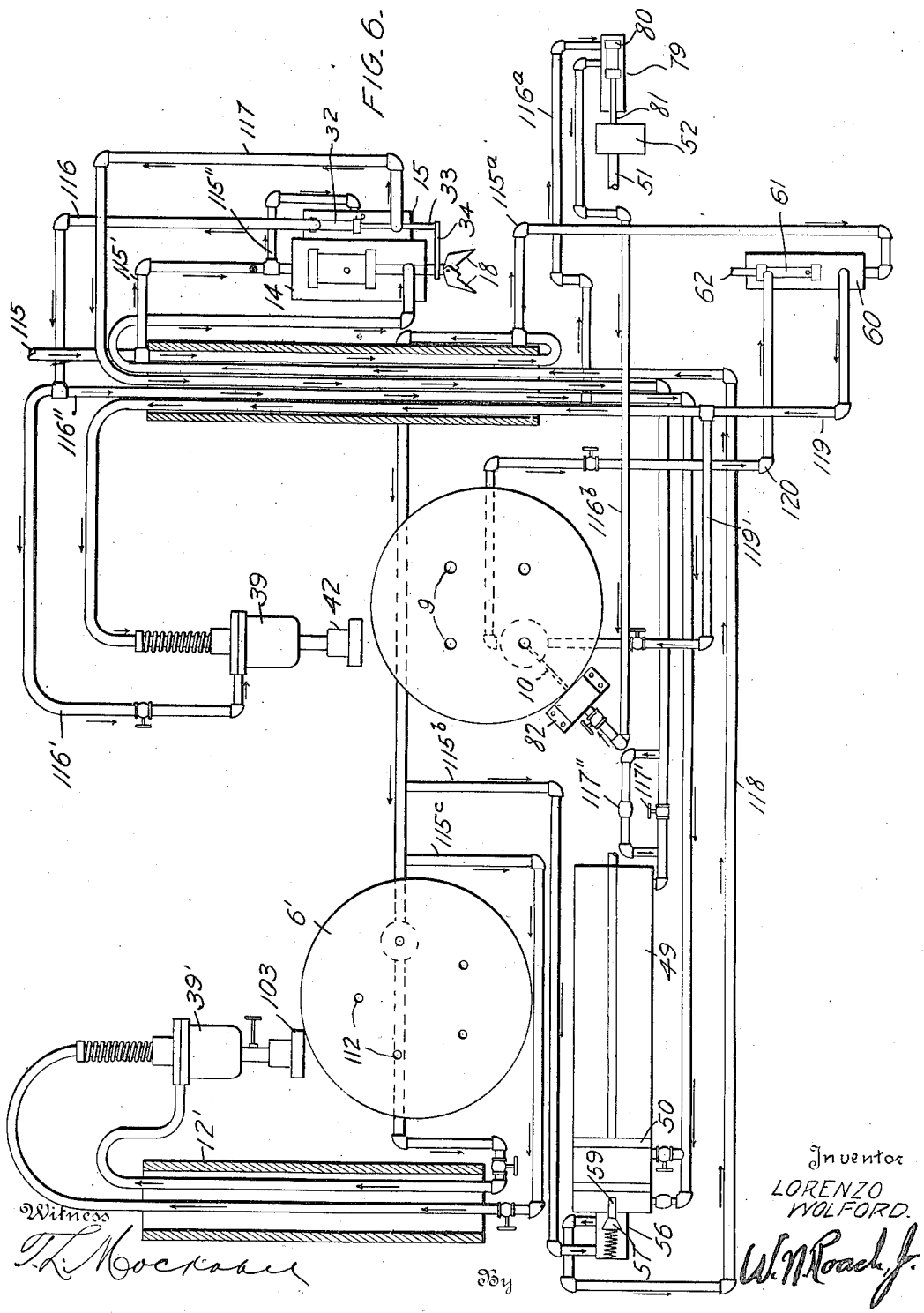

L. WOLFORD.
GLASS BLOWING MACHINE.
APPLICATION FILED APR. 24, 1915.
1,209,635.
Patented Dec. 19, 1916.
10 SHEETS—SHEET 8.
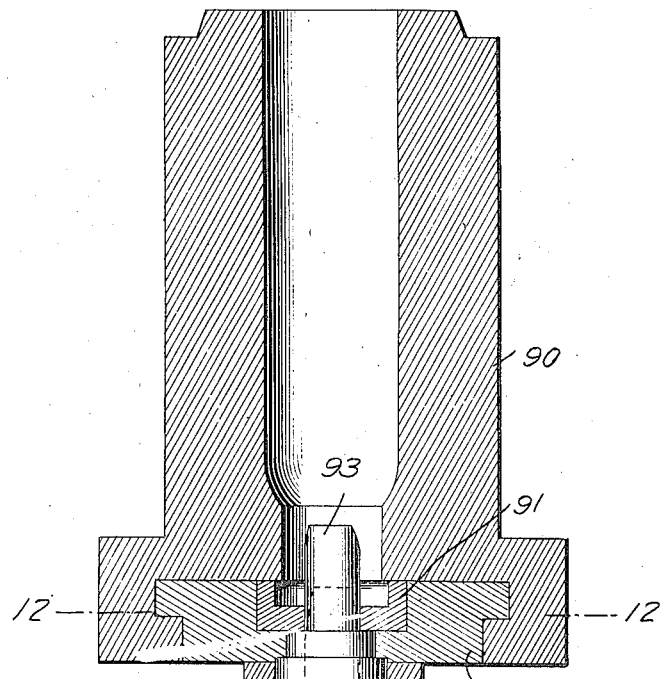
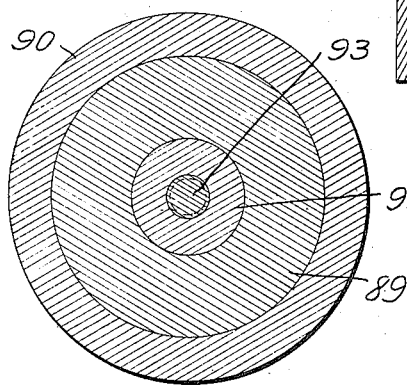
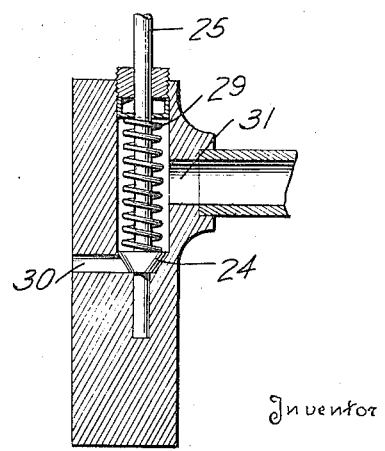
Inventor
LORENZO WOLFORD.
By W. N. Roach, Jr.
Attorney
Witness

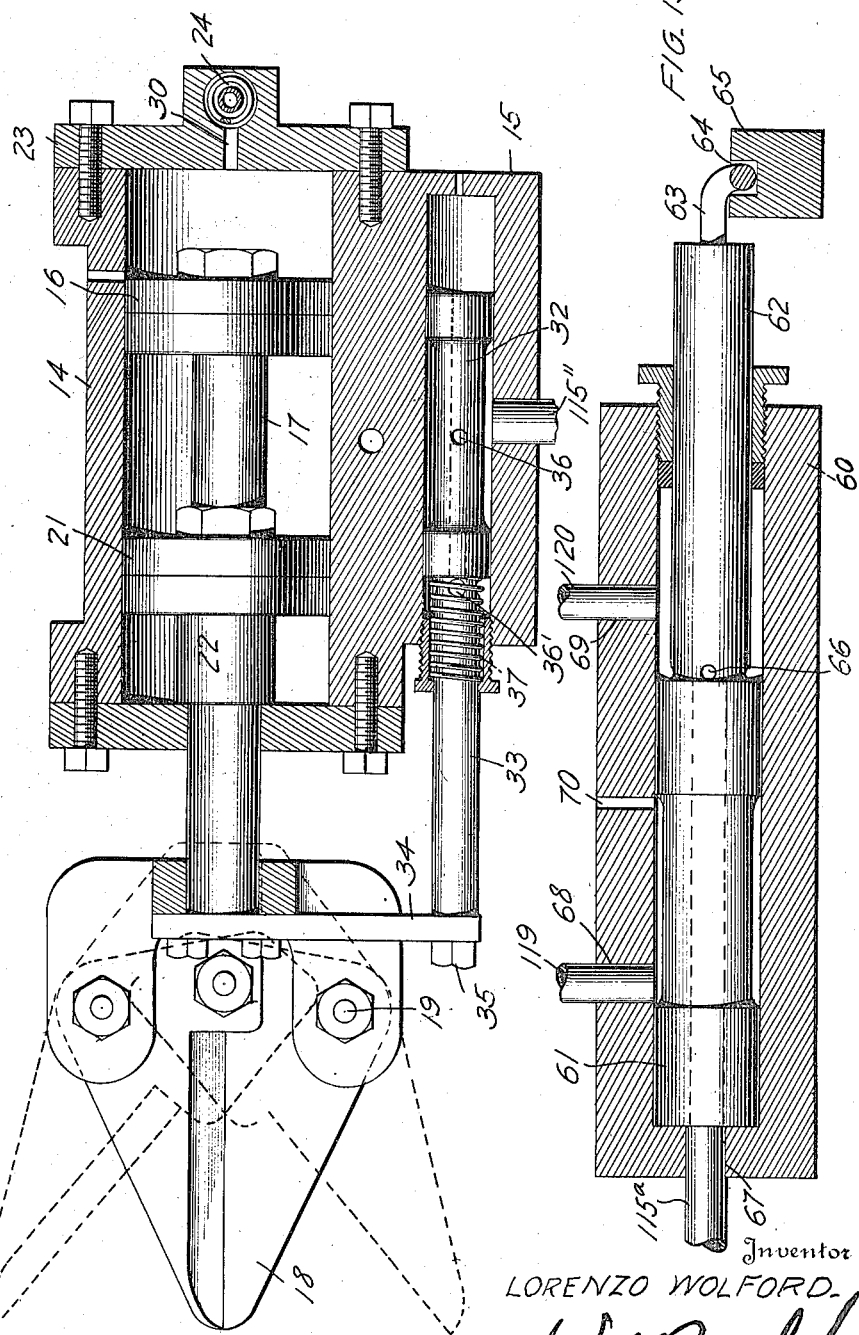

L. WOLFORD.
GLASS BLOWING MACHINE.
APPLICATION FILED APR. 24, 1915.

1,209,635.

Patented Dec. 19, 1916.
10 SHEETS—SHEET 10.

Inventor
LORENZO WOLFORD

Witness

By

Attorney

UNITED STATES PATENT OFFICE.

LORENZO WOLFORD, OF ALEXANDRIA, VIRGINIA, ASSIGNOR TO OLD DOMINION GLASS CORPORATION, OF ALEXANDRIA, VIRGINIA, A CORPORATION OF VIRGINIA.

GLASS-BLOWING MACHINE.

1,209,635.  Specification of Letters Patent.  Patented Dec. 19, 1916.

Application filed April 24, 1915. Serial No. 23,600.

*To all whom it may concern:*

Be it known that I, LORENZO WOLFORD, a citizen of the United States of America, residing at Alexandria, in the county of Alexandria and State of Virginia, have invented certain new and useful Improvements in Glass-Blowing Machines, of which the following is a specification.

This invention relates to glass blowing machines and, more particularly, to machines of this character adapted for blowing bottles and hollow glassware, the operation of the machine being practically automatic.

The objects of the invention are: to provide means for automatically rotating the table with an intermittent motion; to provide automatic means for cutting the air off from the glass compressing port and admitting air to the glass expanding, or blowing port, the mold remaining stationary during said operation; to provide means for automatically cutting off the threads of the charge of molten glass, said means also controlling a portion of the air supply; to provide means for holding the mold closing cap in position by air pressure, independent of the air pressure used for compressing the glass; to provide means by which the table rotating mechanism will control the air for the initial blowing of the bottles; to provide a simple, cheap and efficient glass-blowing machine of a practically automatic type.

Figure 16:
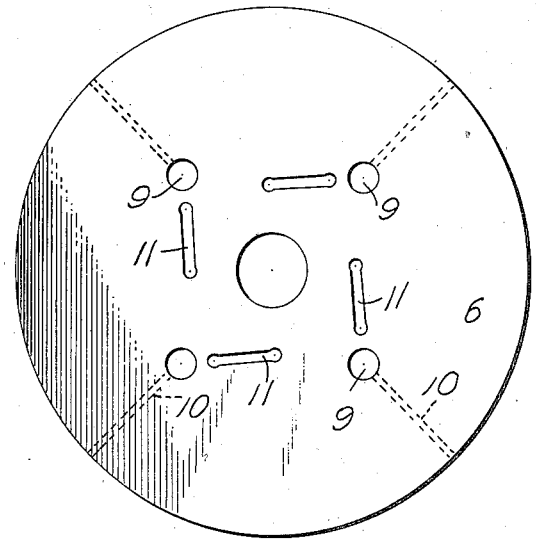
Figure 17:
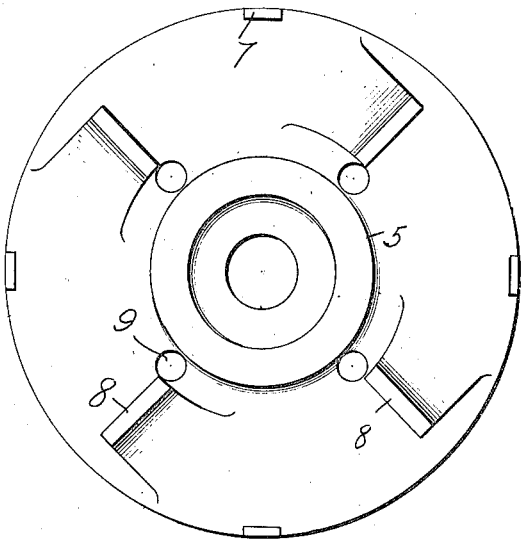
Figure 18:
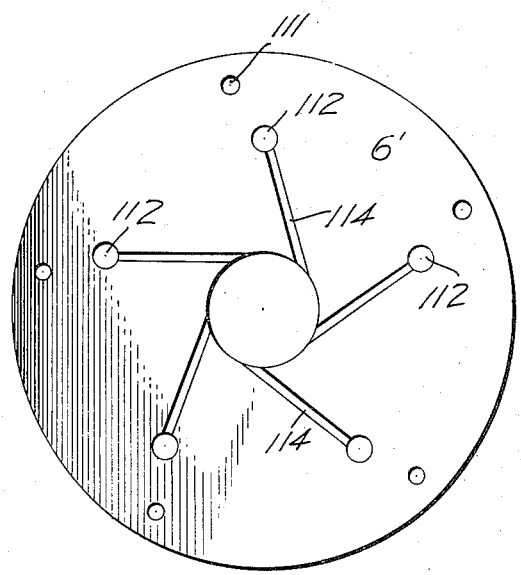
Figure 19:
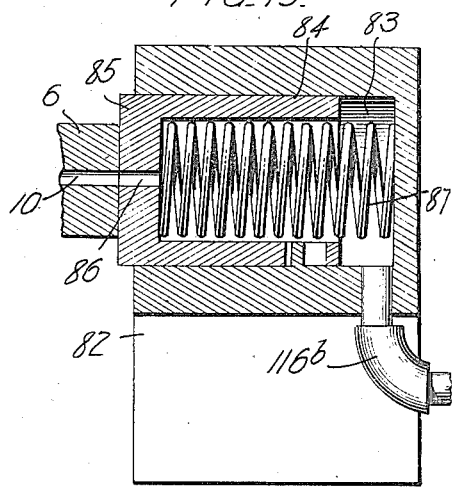

With these and such other objects in view, as may hereinafter more fully appear, my invention consists in the novel arrangement and construction of parts set forth in the following specification, more particularly pointed out in the claims, and which are shown in the accompanying drawings, wherein:

Figure 1 is a side elevation of a complete glass-blowing machine embodying my invention. Fig. 2 is a plan view of the same. Fig. 3 is a side elevation, showing the side opposite to that shown in Fig. 1. Fig. 4 is a sectional view taken on the line 4—4 of Fig. 1. Fig. 5 is a front elevation of the machine. Fig. 6 is a diagrammatic view showing the piping of the machine, with the direction of the air currents therein indicated by arrows. Fig. 7 is a detail sectional view taken on the line A—A of Fig. 2, showing the parts in position for blowing a bottle. Fig. 8 is a detail central vertical section of the mold closing cap. Fig. 9 is a sectional view of the cap taken on the line 9—9 of Fig. 8. Fig. 10 is an enlarged detail view of the valve shown in the upper left hand corner of Fig. 4. Fig. 11 is an enlarged vertical sectional view of the mold, showing the neck forming ring, and opening forming finger in place. Fig. 12 is a sectional view taken on the line 12—12 of Fig. 11. Fig. 13 is a central vertical sectional view of the starting valve. Fig. 14 is a central horizontal sectional view of the cutting mechanism, and air controlling means connected therewith. Fig. 15 is a central horizontal sectional view of the means for cutting off air from the top of the mold and admitting air to the bottom thereof. Fig. 16 is a plan view of the initial blowing table. Fig. 17 is a bottom plan view of the same. Fig. 18 is a plan view of the finishing table. Fig. 19 is a detail vertical sectional view of the block which slidably engages the edge of the table to permit air to be communicated to the bottom of the mold. Fig. 20 is a detail central vertical sectional view showing the original mold with the blank as it appears after being blown therein. Fig. 21 is a detail central vertical sectional view of the finishing mold showing the bottle as it appears finished therein.

Referring to said drawings, in which similar parts are referred to by like numerals throughout the various views: A table, or platform 1 is provided with legs 2 which have their lower ends, preferably, connected by braces 3. The legs 2 likewise have, for convenience of transportation, wheels suitably journaled thereto. Upon the table, or platform 1 are securely fastened the circular plates 4 and 4', which are provided with the usual and well-known circular ball races and balls, and upon said balls rest the centrally disposed, downwardly projecting circular portions 5 and 5' of circular mold carrying tables 6 and 6', respectively.

Referring now more particularly to the initial blowing table 6; said table is provided, on its underside and at the periphery thereof, with suitably spaced, downwardly projecting lugs 7, and is also provided on its under surface with the wedge-shaped projections 8, for a purpose hereinafter set forth. The table 6 is provided with suitable ports, or openings 9 each of which is adapted to receive the mouth of a mold, and the ports 9 are joined to the periphery, or edge of the table by means of suitable bores 10, formed in the material of said table. Adjacent the ports 9 are formed suitable slots 11, the object of the slots being to receive a pin projecting downwardly from the mold and adapted to fit in the slot for the purpose of properly positioning the mold upon the port 9. The table 6 has, centrally positioned thereon, the upwardly extending tubular member 12 to which is fastened, by means of a suitable bracket 13, a cylinder 14, having joined thereto a complementary cylinder 15. Within the cylinder 14 is mounted a piston 16 provided with a piston rod 17, the outer end of which rod 17 is slidably connected to the inner ends of the jaws 18 of a pair of shears, so that the forward motion of the piston rod will close the shears and the rearward motion thereof will cause the shears to be opened. The jaws 18 of the shears are suitably journaled at 19 to a plate 20 which is fastened in any convenient manner to the bottom of the cylinder 14. The piston rod 17 has a second piston 21 mounted thereon within the cylinder 15, the piston 21 resting against an enlarged portion 22 of the rod 17, thereby forming a double piston.

In the rear head 23 of the cylinder 14 is provided an admission valve 24, having a valve stem 25, the head 26 of which is engaged by one end of a lever 27 which is pivoted to a suitable support 28, secured to the top of the cylinder 14. The valve stem 25 is suitably surrounded by a coiled spring 29, for the purpose of maintaining the valve 24 normally upon its seat. The valve 24 normally closes the admission port 30 which is in communication, through the valve casing, with an air port 31.

The cylinder 15 has mounted therein the elongated spool-shaped piston 32, provided with a piston rod 33. The end of the piston rod 33 is connected, by means of a bar 34, to the end of the aforesaid piston rod 17, said bar being fastened to said piston rods in any suitable manner, as by means of the machine screws 35. The piston 32 is centrally bored throughout its length, said bore communicating with a port 36 formed in the piston, and terminating in a port 36', formed in the piston rod 33 immediately adjacent the piston 32. A coiled spring 37 preferably surrounds the piston rod 33, within the cylinder 15.

Secured to the aforesaid cylindrical member 12, by means of a suitable bracket 38, is a cylinder, or dash-pot 39, within which is mounted a piston 40 provided with a hollow piston rod 41 to the outer end of which is secured a mold closure head 42. A pipe 43 extends downwardly through the dash pot 39, and the piston 40 is centrally bored to have a close sliding fit upon the pipe 43, which is adapted to enter the piston and piston-rod when the piston is in its topmost position.

The mold closure head 42 is preferably cylindrical in form and is centrally bored in its upper head, said bore having a sliding fit upon the piston rod 41. A central cylindrical member 43 is mounted within the head 42, the member being centrally bored and adapted to receive the threaded end of piston rod 41. The lower end of the member 43 is centrally bored, the bore being preferably reamed at its upper portion. Within said bore is placed a valve 44 adapted to fit closely within the reamed portion and being provided with a valve stem 45 extending within the aforesaid bore, the said stem being preferably triangular in cross section. A dished plate 46 is secured to the lower end of the head 42, in any suitable manner, as by the machine screws 47, the head 46 being provided with central air ports 48 adapted to aline with the bore of the member 43.

Suitably mounted upon the table or platform 1, is a cylinder 49, in which is mounted a piston 50 provided with a piston rod 51. The outer end of piston rod 51 carries a block 52 in a suitable slot in which is pivotally secured a gravity actuated dog or pawl 53. Block 52 is also provided with a laterally extending arm 54 provided with a down-turned end 55, for a purpose hereinafter to be described.

To the rear end of cylinder 49 is suitably secured an air chamber 56 in which is a resiliently retained valve 57 adapted to normally close the admission port 58 formed in the rear head of the cylinder 49. Valve 57 is provided with a valve stem 59 which extends within the cylinder 49 in such a position as to be struck by the piston 50 as it reaches the limit of its rearward motion, and so open the port 58 for the admission of air to the air chamber 56.

Suitably secured to the table 1, is a cylinder 60, provided with an elongated spool shaped piston 61 having a piston-rod 62 which terminates in an attenuated curved head 63 which is adapted to slidably engage a slot 64 formed in the end of an irregular bar 65, which is pivotally secured to the table 1. The piston 61 is centrally bored throughout its length, and said bore terminates in a port 66, formed in the piston-rod 62 immediately adjacent the piston 61. The cylinder 60 is provided with an admission port 67, discharge ports 68 and 69 and an exhaust port 70.

Pivotally secured to table 1 is an arm 71, provided with a block 72, in which block is formed an irregular slot 73 in which is pivotally mounted a spring retained pawl or dog 74. The arm 71 is resiliently retracted in any suitable manner, as by the coil spring 75, one end of which is secured to the arm and the other end of which is preferably secured to the circular portion 4 of the table 1.

Secured to platform 1, immediately below table 6, is a block 76 provided with a vertically disposed open slot 77, in the top thereof, in which is pivotally secured a resiliently actuated dog or pawl 78.

Secured to the platform 1, and perferably below the same is a cylinder 79 in which is mounted a piston 80, the piston-rod 81 of which is adapted to be struck by the block 52, which is carried by piston rod 57, for the purpose of actuating the piston 80.

Secured to the platform 1, and positioned adjacent the periphery of table 6, is a block 82 provided with a preferably cylindrical bore 83 in which is slidably mounted a cylindrical member 84, said member being open at its inner end and having its head 85 provided with a central port 86 adapted to register with the bores 10, formed in table 6. The head 85, of cylindrical member 84, is retained in close contact with the periphery of table 6, in any suitable manner, as by means of the coil spring 87.

Pivotally secured to the platform 1, is the angular bar 65, in an open slot 64, of which, a curved end 63 of piston rod 62 is slidably mounted. The bar 65 is so positioned as to be struck by the block 52, carried by the piston rod 51, on its outward travel and, when the piston rod 51 is retracted, the downwardly projecting end 55 engages the outer edge of the bar 65 and draws the same back to normal position. Within the openings 9, formed in the table 6, are placed the cylindrical members 88, each provided at its upper end with an irregular flange 89 adapted to be received in the head of the molds 90, as shown most clearly in Fig. 11. The heads of circular members 88 are each provided with a central depressed portion for the reception of the mouth forming ring 91. Within said cylindrical member 88 is mounted a piston 92 carrying, on the upper end thereof, a finger 93, and having its lower end extending downwardly below said member 88 and terminating in a flange portion 94.

Formed partly around the periphery of the circular plate 4 is an inclined way, or cam 95, the lower portion of said incline being indicated at $a$, Fig. 4, and the top of said incline being indicated at $b$, Fig. 4. From the top of the incline 95 a level horizontal track 96 leads to a centrally-slotted gripping head 97, into which the aforesaid flange 94, of piston 92, is adapted to slide. The head 97 is carried by a piston rod 98 which is suitably secured to a piston 99, slidably mounted within a vertically disposed cylinder 100, suitably secured to the under side of the platform 1. The cylindrical member 88 has a horizontal groove 101, formed near the top thereof, said groove completely encircling the member 88. Leading to the interior of member 88, from the groove 101, is a suitable air port 102.

Mounted on the table 6' is a centrally disposed tubular member 12' to which is secured, by means of a bracket 38', a dash-pot 39', said dash-pot being in all respects similar to the hereinbefore described dash-pot 39. The piston rod 41' carried by the piston within the dash-pot 39', has suitably secured thereon, a mold closing head 103 which is formed to give a proper finish to the bottles. A lever 104 is suitably pivoted to the downturned end 105 of a bar 106, which is carried by the aforesaid braces 3. The free end of lever 104 terminates, preferably, in a treadle 107. The lever 104 has pivotally secured thereto, near the center thereof, a rod 108 provided with a collar 109, between which said collar and the bar 106 is retained a coiled spring 110, which encircles the rod 108. The upper end of rod 108 is adapted to engage suitable openings 111, formed in table 6', for the purpose of locking the table in place, and may be released therefrom by downward pressure upon the treadle 107, when it is desired to revolve the table 6'. The table 6' is provided with suitable openings 112 for the reception of the molds 113, said molds being of any suitable form, depending upon the shape and size of the bottle or other hollow glassware to be finished. Table 6' is further provided with grooves 114, the outer end of each of which terminates in one of the openings 112, and the inner end of each of which terminates near the center of the table 6', the purpose of said grooves being to receive the downwardly projecting pin carried by the mold 113, for the purpose of properly positioning the molds upon the openings 112.

Leading from a suitable source of fluid pressure, preferably an air compressor, is a supply pipe 115 provided with a branch 115' which terminates in the admission port 31 at the rear of the cylinder 14. Leading from said branch 115', just before it enters the port 31, is a sub-branch 115'' which leads to the cylinder 15, entering near the center thereof, as is shown most clearly in Fig. 6. The pipe 115 passes downwardly through the cylindrical member 12 and, from thence, to the finishing table 6'. A branch 115$^a$ leads from the pipe 115, after it leaves the cylindrical member 12, said branch terminating in the rear of cylinder 60. A second branch 115$^b$ leads from the pipe 115 and terminates in the air chamber 56, situated at the rear of the cylinder 49. A third branch 115$^c$ leads from the pipe 115, up through the tubular member 12', to dash-pot 39', through which it communicates with the closure head 103.

Leading from the rear of the air control cylinder 15 is a pipe 116, which terminates in two branches, one of which, 116', leads to the dash-pot 39, while the other branch 116'' leads downwardly through the tubular member 12 and terminates in the rear end of cylinder 49. Leading from the branch 116″ is a sub-branch 116ª which communicates with the cylinder 79 near the rear thereof. From the cylinder 79 is a pipe 116ᵇ which terminates in the block 82. Leading from the forward end of the air control cylinder 15 is a pipe 117, which passes downwardly through the tubular member 12 and enters the forward end of the cylinder 49, said pipe being preferably provided with a check valve 117′, spanned by a by-pass 117″, the same being situated near the entrance of the pipe 117 to the cylinder 49. A pipe 118 leads from the air chamber 56, upwardly through the tubular member 12 and enters the forward end of the cylinder 14. An air pipe 119 leads from the rear end of the cylinder 60 and passes upwardly through the tubular member 12, and enters the dash-pot 39, through which it communicates with the closure head 42. A branch pipe 119′ leads from the pipe 119 and enters the lower end of the cylinder 100. Leading from the forward end of the cylinder 60 is an air pipe 120, which enters the upper end of the cylinder 100.

The operation of the device is as follows: A mold, being in charging position, (that is below the cutting shears), the operator, having placed the proper amount of molten glass in the mold, strikes the forward end of the lever 27, causing the rear end thereof to contact the head 26 of the valve stem 25, thereby lifting the valve 24 from its seat and allowing air to escape from branch pipe 115′, through port 31, to the interior of the valve casing, and from thence through the port 30 to the cylinder 14, thereby forcing the piston 16 forward and closing the shears 18 for the purpose of cutting the threads of the glass. This forward motion of the piston 16, and with it the piston rod 17, throws forward the piston 32 by means of the communicating rod 34, which is rigidly secured to the two piston rods. The forward motion of the piston 32 opens the entrance to the pipe 116 and allows air to pass from the branch pipe 115″ through the cylinder 15, to pipe 116. The air from pipe 116 divides and passes through branch 116′ to the dash-pot 39 where it acts upon the upper surface of the piston 40, forcing the same downwardly and with it the closure head 42. The air also passes through branch 116″ to the rear end of the cylinder 49 where it exerts pressure upon the piston 50 forcing the same forward, and with it the piston rod 51. Air also passes through the sub-branch 116ª to the rear end of the cylinder 79. As the piston 50 and piston rod 51 are forced forward, the block 52, carried by the head of the piston rod 51, contacts the inner edge of the lever 65, forcing the same outwardly. As lever 65 is forced outwardly it carries with it the piston rod 62 and piston 61, mounted in cylinder 60, thereby closing the opening in said cylinder 60 to pipe 119, through which air has been admitted, up to this time, to the closure head 42, and opens the port of pipe 120, which pipe terminates in the upper end of cylinder 100. The air from pipe 120, entering cylinder 100, acts upon the upper surface of the piston 99 forcing the same downwardly and with it the head 97. At the same time the block 52 strikes the piston rod 81, of the piston 80, admitting air from the pipe 116ª to the cylinder 70, from whence it passes through the pipe 116ᵇ to the pressure block 82. The forward motion of the piston 50 releases the spring actuated valve 58, situated in the air chamber 56, and permits air to pass from said chamber through the pipe 118 to the forward end of the cylinder 14, thereby forcing the piston 16 rearwardly and opening the shears 18. As the piston 16 moves rearwardly it carries with it the piston 32, thereby closing the admission of air to the pipe 116 and opening the pipe 117 to the admission of air. Air then passes through pipe 117 to the forward end of the cylinder 49 where it acts upon the piston 50 causing the same to be forced rearwardly and carry with it the block 52, secured to the head of the piston rod 51. As block 52 travels rearwardly the dog 53 catches upon one of the projections 8, on the bottom of the table 6, and revolves the table. At the same time the downwardly projecing end 55 of the arm 54 engages the lever 65, throwing the same inwardly and carrying with it piston rod 62 of piston 61, thereby placing all parts in their original positions. As the table revolves, the spring actuated dog 78 carried by the block 76 engages one of the projections 8 to prevent the table from being revolved in a reverse direction, and the dog 74 carried by the lever 71 engages one of the lugs 7, on the periphery of the table, to lock the table against forward revolution; the dog 74 being disengaged from the lug 7, when the table is to be revolved, by the block 52 striking the end of the lever 71.

As will be apparent from the foregoing, air is admitted to compress the glass in the mold from the time the lever 27 is struck until the piston 50 reaches the limit of its forward stroke. When this position is reached, air for compression is cut off and air for blowing the bottle is admitted until the piston 50 has reached a position, on its return stroke, such that the down-turned end 55 of finger 54 engages the rod 65 at the point 65′, and throws the same to actuate the piston rod 62. The blanks, after being blown, are removed from the mold and placed in a mold on the finishing table, where they are blown to the desired finish.

From the foregoing description, taken in connection with the accompanying drawings, it is thought that the construction, mode of operation, and advantages of the invention will be readily apparent without requiring any further or more extended explanation.

Various changes in the form, proportion, and minor details of construction may be resorted to without departing from the principle or sacrificing any of the advantages of this invention, and I therefore reserve to myself the right to make such changes as fairly fall within the scope thereof.

It is obvious that many variations and changes in the details of construction and arrangement of my invention would readily suggest themselves to persons skilled in the art, and still be within the spirit and scope of my invention.

Having described my invention, what I claim as new and desire to secure by Letters Patent, is:—

1. In a glass blowing machine, a platform, a mold carrying table rotatably mounted thereon, said table being provided with radially disposed bores, a source of fluid pressure supply, means engaging the edge of said table to communicate the fluid pressure, through said bores, to the molds, mechanism for revolving the table, and means, actuated by said mechanism, for controlling the supply of fluid pressure to said table engaging means.

2. In a glass blowing machine, a platform, a mold carrying table rotatably mounted on said platform, said table being provided with suitable bores, a block beside the table, a resiliently retained table engaging member mounted in said block, a source of fluid pressure supply connected to said block, and means for automatically controlling the supply of fluid pressure to said block.

3. In a glass blowing machine, a platform, a mold carrying table rotatably mounted on said platform, said table being provided with bores connecting the periphery of the table with the molds, a block secured to said platform adjacent the periphery of said table, a table engaging member carried by said block, said member being provided with a bore adapted to aline with the bores in the table, a source of fluid pressure supply, connections between said source and said block, and an automatically actuated valve situated in said connections for controlling the supply of fluid pressure to said block.

4. In a glass blowing machine, a suitable platform, a mold carrying table rotatably mounted thereon, a mold carried by said table, a mouth forming finger extending within said mold, mechanism for revolving said table, and fluid pressure controlling means, actuated by said mechanism to withdraw the finger from the mold.

5. In a glass blowing machine, a platform, a mold carrying table rotatably mounted on said platform, a mold carried by said table, a mouth forming finger extending within said mold, a mold closure cap adapted to engage said mold, means connected to said cap for compressing the charge in the mold, mechanism for revolving the table, and means actuated by said mechanism for stopping the compression and withdrawing said finger.

6. In a glass blowing machine, a platform, a mold carrying table rotatably mounted thereon, a mold carried by said table, a mouth forming finger extending into said mold, a mold closure cap adapted to engage the mold, means connected to the cap for compressing the charge in the mold, mechanism for revolving the table, means actuated by said mechanism for stopping the compression and withdrawing the finger, and a valve actuated by said mechanism to admit pressure to expand the charge in the mold.

7. In a glass blowing machine, a platform, a mold carrying table rotatably mounted thereon, a mold carried by said table, a mouth forming finger normally extending into said mold, mechanism for revolving the table, means below the table for engaging the mouth forming finger, and means actuated by said mechanism to operate the finger engaging means to withdraw the finger from the mold.

8. In a glass blowing machine, a platform, a mold carrying table rotatably mounted thereon, a mold carried by the table, a mouth forming finger extending within the mold, a cylinder below the table, a piston within said cylinder, a finger engaging member carried by the piston, mechanism for revolving the table, and means actuated by said mechanism for raising the piston to cause the finger to be engaged and lowering the piston to withdraw the finger from the mold.

9. In a glass blowing machine, a platform, a mold carrying table rotatably mounted thereon, a mold carried by the table, a mouth forming finger extending within the mold, finger engaging means below the table, mechanism for revolving the table, means actuated by the mechanism to operate the finger engaging means to withdraw the finger, and a valve actuated by the mechanism to admit pressure to the mold to expand the charge.

In testimony whereof I hereunto affix my signature in presence of two witnesses.

LORENZO WOLFORD.

Witnesses:
Thos. Simpson,
W. H. Wood, Jr.